(12) United States Patent
Krishnappa

(10) Patent No.: US 8,479,289 B1
(45) Date of Patent: Jul. 2, 2013

(54) METHOD AND SYSTEM FOR MINIMIZING THE EFFECTS OF ROGUE SECURITY SOFTWARE

(75) Inventor: Bhaskar Krishnappa, Gloucester (GB)

(73) Assignee: Symantec Corporation, Mountain View, CA (US)

( * ) Notice: Subject to any disclaimer, the term of this patent is extended or adjusted under 35 U.S.C. 154(b) by 819 days.

(21) Appl. No.: 12/606,418

(22) Filed: Oct. 27, 2009

(51) Int. Cl.
*G08B 23/00* (2006.01)

(52) U.S. Cl.
USPC ............. 726/23; 726/22; 726/24; 726/25

(58) Field of Classification Search
USPC ...................................... 726/22, 23
See application file for complete search history.

(56) References Cited

U.S. PATENT DOCUMENTS

| | | | | |
|---|---|---|---|---|
| 6,968,507 | B2 * | 11/2005 | Pennell et al. | 715/781 |
| 7,111,246 | B2 * | 9/2006 | Sauve et al. | 715/809 |
| 7,290,282 | B1 * | 10/2007 | Renert et al. | 726/24 |
| 7,310,817 | B2 * | 12/2007 | Hinchliffe et al. | 726/24 |
| 7,340,774 | B2 * | 3/2008 | Hursey et al. | 726/22 |
| 7,757,292 | B1 * | 7/2010 | Renert et al. | 726/24 |
| 7,765,406 | B2 * | 7/2010 | Friedline | 713/182 |
| 7,779,472 | B1 * | 8/2010 | Lou | 726/24 |
| 7,877,800 | B1 * | 1/2011 | Satish et al. | 726/22 |
| 8,037,527 | B2 * | 10/2011 | Milener et al. | 726/22 |
| 8,079,085 | B1 * | 12/2011 | Wu et al. | 726/24 |
| 8,161,130 | B2 * | 4/2012 | Stokes et al. | 709/217 |
| 8,312,537 | B1 * | 11/2012 | Nachenberg et al. | 726/22 |
| 2005/0021994 | A1 * | 1/2005 | Barton et al. | 713/200 |
| 2006/0005148 | A1 * | 1/2006 | Cheng et al. | 715/808 |
| 2006/0031673 | A1 * | 2/2006 | Beck et al. | 713/164 |
| 2008/0184368 | A1 * | 7/2008 | Coon et al. | 726/23 |
| 2009/0198673 | A1 * | 8/2009 | Gao et al. | 707/5 |
| 2009/0249482 | A1 * | 10/2009 | Sarathy | 726/22 |

* cited by examiner

*Primary Examiner* — Linglan Edwards
(74) *Attorney, Agent, or Firm* — McKay and Hodgson, LLP; Serge J. Hodgson; Sean P. Lewis

(57) ABSTRACT

A method and apparatus for minimizing the effects of rogue security software leverages the fact that virtually all rogue security software generates malware alerts to scare the user/victim into submitting their payment information, and the fact that the malware alerts generated by rogue security software are almost never changed. In one example, a user computing system is monitored/scanned for any alerts being presented to the user. Once an alert is detected, the alert content is sampled and analyzed for defined keywords that indicate the alert is a malware alert and any alert including the defined keywords is considered a malware alert and is treated as being potentially generated by rogue security software. All malware alerts are therefore subjected to an initial malware alert analysis before the user is allowed to see, and/or respond, at least without a warning, to the malware alert. If it is determined that the malware alert is suspicious for any reason, then the malware alert is determined to be potentially generated by rogue security software and the user is prevented from seeing, and/or responding to, at least without a warning, the malware alert until a more definitive analysis can be performed.

20 Claims, 4 Drawing Sheets

METHOD AND SYSTEM FOR MINIMIZING THE EFFECTS OF ROGUE SECURITY SOFTWARE

BACKGROUND OF THE INVENTION

Rogue security software is a form of computer malware that deceives or misleads users/victims into paying for the fake or simulated removal of malware, and/or, in some cases, removal of malware intentionally introduced by the rogue security software itself. In recent years, rogue security software has become a growing and serious security threat to computing system and communication networks. This is particularly true given that the methods used by perpetrators of rogue security software have become extremely sophisticated and highly responsive and dynamic over the past few years.

Herein, malware includes, but is not limited to, any software and/or code designed to infiltrate a computing system without the owner's informed and/or explicit consent. Some of the better known forms of malware include computer viruses and spyware.

Rogue security software typically relies on social engineering in order to defeat the security built into modern operating systems, browser software, and security systems, and install itself onto users'/victims' computing systems. Most rogue security software has a Trojan horse component which users/victims are misled into installing onto/into their computing systems. The Trojan horse may be disguised as, but is not limited to: free online malware scanning services; a browser plug-in or extension (typically toolbar); an image, screensaver, or archive file, attached to an e-mail message; a multimedia codec allegedly, or actually, required to play a certain video clip; software shared on peer-to-peer networks; and/or any other examples of the seemingly ever-evolving number of Trojan horse devices. In addition, some rogue security software is propagated onto a user/victim computing system as drive-by downloads which exploit security vulnerabilities in web browsers or e-mail clients to install themselves without any manual interaction by the user.

Once installed, the rogue security software typically generates a malware alert notifying the user/victim of the fake or simulated detection of malware, pornography, or any other undesirable files, on the user's/victim's computing system and/or displays an animation simulating a fake system crash and reboot of user's/victim's computing system. In some instances, the rogue security software includes detailed malware alerts and/or message boxes that list specific files that purportedly are the malware, are infected with the malware, and/or contain the malware. In some instances, the rogue security software alerts the user/victim to performance problems or the need to perform essential housekeeping on the user's/victim's computing system. Often the rogue security software scares the user/victim by presenting authentic-looking pop-up warnings and security alerts, which often very accurately mimic legitimate system and/or security system notices to leverage the trust of the user/victim in vendors of legitimate security software, and/or operating systems, and/or web-sites, and/or businesses.

In addition, some rogue security software selectively disables parts of the computing system to prevent the user/victim from uninstalling them. In addition, some rogue security software may also prevent security systems from running, disable automatic system software updates, and block access to websites of security system vendors.

In some instances, rogue security software may install actual malware onto a computing system and alert the user/victim after "detecting" them. This method is less common as the actual malware is more likely to be detected by legitimate security systems.

Once the rogue security software has alerted, and/or scared, the user/victim into believing their system has been infected with malware, the user/victim is then enticed to pay for malware removal services offered through the rogue security software to remove the fake, simulated, or intentionally introduced, malware. Often the user/victim is then asked to provide credit card, or other payment, information to pay for the malware removal services. In some cases, the user/victim is merely charged the stated amount for the malware removal services, and therefore only the stated amount is effectively stolen from the user/victim. In other cases, the user's/victim's payment information is used to steal lager amounts from the user/victim and/or to achieve identity theft.

Currently, detection of rogue security software using legitimate security systems is a fairly time intensive and resource consuming process that is largely reactionary in nature. For instance, currently, an infected consumer of the security system contacts the security system provider and/or provides a sample of the suspected rogue security software. Then researchers associated with the security system typically download the suspected rogue security software itself and analyze the suspected rogue security software. Once the suspected rogue security software is analyzed, if it is indeed found to be rogue security software, a sample of the rogue security software itself is added to a rogue security software signature database and further instances of the rogue security software are thereby, in theory, identifiable and stoppable.

As noted, current detection of rogue security software using currently available legitimate security systems is a time intensive and resource consuming reactionary process that uses samples of the rogue security software itself to identify future instances of specific rogue security software. This means that, using currently available security systems, even user identified rogue security software is provided significant time and opportunity to infect more systems, and create more victims, before an adequate defense is created and implemented. In addition, as noted above, the methods used by perpetrators of rogue security software have become quite sophisticated and the perpetrators of rogue security software have become quite adept at changing the characteristic and operational parameters associated with the rogue security software, such as names, version data, and web-pages, Graphical User Interfaces (GUIs) to avoid detection, or respond to detection, of the rogue security software by various legitimate security systems. Consequently, rogue security software is a very serious threat that, thus far, has proven extremely difficult to detect and block using currently available legitimate security systems.

SUMMARY

According to one embodiment of a method and apparatus for minimizing the effects of rogue security software, the fact that virtually all rogue security software generates malware alerts to scare the user/victim into submitting their payment information, and the fact that the malware alerts generated by rogue security software are almost never changed, is used to proactively identify potential rogue security software.

In one embodiment, a given user computing system is monitored/scanned for any alerts being presented to the user. In one embodiment, once an alert is detected, the alert content is sampled and analyzed for defined keywords that indicate the alert is a malware alert. In one embodiment, any alert sample including the defined keywords is considered a malware alert and is treated as being potentially generated by rogue security software. In one embodiment, all such malware alerts are subjected to an initial malware alert analysis before the user is allowed to see, and/or respond, at least without a warning, to the malware alert including, but not limited to: scanning the malware alert to determine what files are identified in the malware alert as purportedly containing malware and scanning/analyzing the named files to determine if they do indeed contain malware, or if the files even exist; scanning and/or comparing the malware alert with one or more security systems and known rogue security software signatures associated with one or more security system providers; and/or subjecting the malware alert to any other analysis desired. In one embodiment, if, as a result of the initial malware alert analysis, it is determined that the files identified in the malware alert either do not exist, or are uninfected, or that the malware alert is suspicious for any other reason, then the malware alert is determined to be potentially generated by rogue security software and the user is prevented from seeing, and/or responding to, at least without a warning, the malware alert until a more definitive analysis can be performed.

According to one embodiment of a method and apparatus for minimizing the effects of rogue security software, at least part of the process for minimizing the effects of rogue security software is implemented by one or more processors associated a user computing system and the given user computing system is monitored/scanned for any alerts being presented to the user at the user computing system. According to one embodiment of a method and apparatus for minimizing the effects of rogue security software, at least part of the process for minimizing the effects of rogue security software is implemented by one or more processors associated with a security system provider computing system and the given user computing system is monitored/scanned for any alerts being presented to the user at the security system provider computing system.

Herein, the term "alert" includes any graphical and/or textual display shown to a user in an effort to attract a user's attention to the status of any element and/or sub-element of a user computing system. For instance, herein, the term alert includes, but is not limited to: any bubble display shown to a user in an effort to attract a user's attention to the status of any element and/or sub-element of a user computing system; any text box shown to a user in an effort to attract a user's attention to the status of any element and/or sub-element of a user computing system; any pop-up display shown to a user in an effort to attract a user's attention to the status of any element and/or sub-element of a user computing system; any static graphic shown to a user in an effort to attract a user's attention to the status of any element and/or sub-element of a user computing system; any animated graphic shown to a user in an effort to attract a user's attention to the status of any element and/or sub-element of a user computing system; any audio element provided to a user in an effort to attract a user's attention to the status of any element and/or sub-element of a user computing system; or any other mechanism used to shown to a user in an effort to attract a user's attention to the status of any element and/or sub-element of a user computing system as discussed herein, and/or as known in the art at the time of filing, and/or as developed after the time of filing.

In one embodiment, the given user computing system is monitored/scanned for any type of alert, including malware alerts and/or any other system and/or application alerts. In one embodiment, once an alert is detected, the alert content is sampled and analyzed by one or more processors for defined keywords that indicate the alert is a malware alert. In various embodiments, the defined keywords include, but are not limited to: virus; damage; malware; privacy; infected; warning; antivirus; performance; scan; infection; and/or any other keywords defined by the provider of the process for minimizing the effects of rogue security software and/or one or more users of the process for minimizing the effects of rogue security software.

In one embodiment, any alert including the defined keywords is considered a malware alert and is treated by the process for minimizing the effects of rogue security software as being potentially generated by rogue security software until the malware alert is more definitively determined to be legitimate. In this way, the user is protected while analysis of the malware alert is being performed.

In one embodiment, all identified malware alerts are subjected to initial malware alert analysis before the user is allowed to see, and/or respond, at least without a warning, to the malware alert that includes, but is not limited to, scanning the malware alert to determine what files are identified in the malware alert as purportedly containing malware and then scanning the user computing system to determine if the files identified in the malware alert as purportedly containing malware even exist. This is a useful check given that many files named in the malware alerts associated with rogue security software are completely fictitious and therefore will not be present on the user computing system.

In one embodiment, all identified malware alerts are subjected to initial malware alert analysis before the user is allowed to see, and/or respond, at least without a warning, to the malware alert that includes, but is not limited to, scanning the malware alert to determine what files are identified in the malware alert as purportedly containing malware and comparing the files identified in the malware alert as purportedly containing malware with known "clean" copies of the files to determine if they do indeed contain malware. This check is particularly useful when the files identified in the malware alert as purportedly containing malware are system files and/or application files for which known clean copies can be easily obtained/accessed.

In one embodiment, all identified malware alerts are subjected to initial malware alert analysis before the user is allowed to see, and/or respond, at least without a warning, to the malware alert that includes, but is not limited to, scanning the malware alert to determine what files are identified in the malware alert as purportedly containing malware and identifying a source of the files identified in the malware alert as purportedly containing malware to determine if the source of the files identified in the malware alert as purportedly containing malware is the malware alert itself. This check is particularly useful for detecting instances where rogue security system software introduces the malware alert and the malware alert drops files into the user computing system which are then "identified" by the malware alert as purportedly containing malware, i.e., instances where the malware alert is the source of the files identified in the malware alert as purportedly containing malware is the malware alert itself.

In one embodiment, all identified malware alerts are subjected to initial malware alert analysis before the user is allowed to see, and/or respond, at least without a warning, to the malware alert that includes, but is not limited to, scanning the malware alert to determine what files are identified in the malware alert as purportedly containing malware and identifying a source of the files identified in the malware alert as purportedly containing malware to determine if the source of the files identified in the malware alert as purportedly containing malware is the same source as the malware alert. This check is particularly useful for detecting instances when the files identified in the malware alert as purportedly containing malware are files that were placed on the user commuting system by the same rogue security system that also provided the malware alert itself, i.e., instances where both malware and the malware alert have the same source.

In one embodiment, all identified malware alerts are subjected to initial malware alert analysis before the user is allowed to see, and/or respond, at least without a warning, to the malware alert that includes, but is not limited to, scanning/analyzing the named files using one or more security systems associated with one or more security system providers to determine if they do indeed contain malware.

In one embodiment, all identified malware alerts are subjected to initial malware alert analysis before the user is allowed to see, and/or respond, at least without a warning, to the malware alert that includes, but is not limited to, scanning/analyzing the named files using one or more security systems associated with one or more security system providers to determine if they do indeed contain malware.

In one embodiment, if, as a result of the initial malware alert analysis, it is determined that the files identified in the malware alert either do not exist, or are uninfected, or that the malware alert is suspicious for any other reason, then the malware alert is labeled as being potentially generated by rogue security software and the user is prevented from seeing, and/or responding to, at least without a warning, the malware alert until a more definitive analysis can be performed.

In on embodiment, once a more definitive analysis is performed, if the malware alert is deemed to be generated by rogue security software, signature data for the malware alert is stored in a rogue security software malware alert database and the data in the rogue security software malware alert database is used to identify future instances of the malware alert as being rogue security software malware alerts.

Using the method and apparatus for minimizing the effects of rogue security software, as discussed herein, the fact that virtually all rogue security software generates malware alerts to scare the user/victim into submitting their payment information is used to focus detection of rogue security software efforts on the malware alerts themselves. In addition, the method and apparatus for minimizing the effects of rogue security software, as discussed herein, makes use of the fact that, while developers of rogue security software often change the GUI associated with the rogue security software, they rarely, if ever, change the malware alerts generated by rogue security software or the infection mechanism used by the rogue security software. This is because if the malware alert changes, the users/victims are less likely to trust the malicious malware alert.

In addition, using the method and apparatus for minimizing the effects of rogue security software, as discussed herein, virtually all malware alerts are treated as suspect, and the user is prevented from seeing, and/or responding to, at least without a warning, the malware alert until at least an initial malware alert analysis can be performed. Consequently, unlike currently available reactive rogue security software systems, the method and apparatus for minimizing the effects of rogue security software, as discussed herein, is proactive and seeks to protect the user before any harm can be done.

As a result, using the method and apparatus for minimizing the effects of rogue security software, as discussed herein, rogue security software is more reliably and quickly detected and, therefore, fewer users are likely to fall victim to these very serious and damaging scams.

Figure 1:
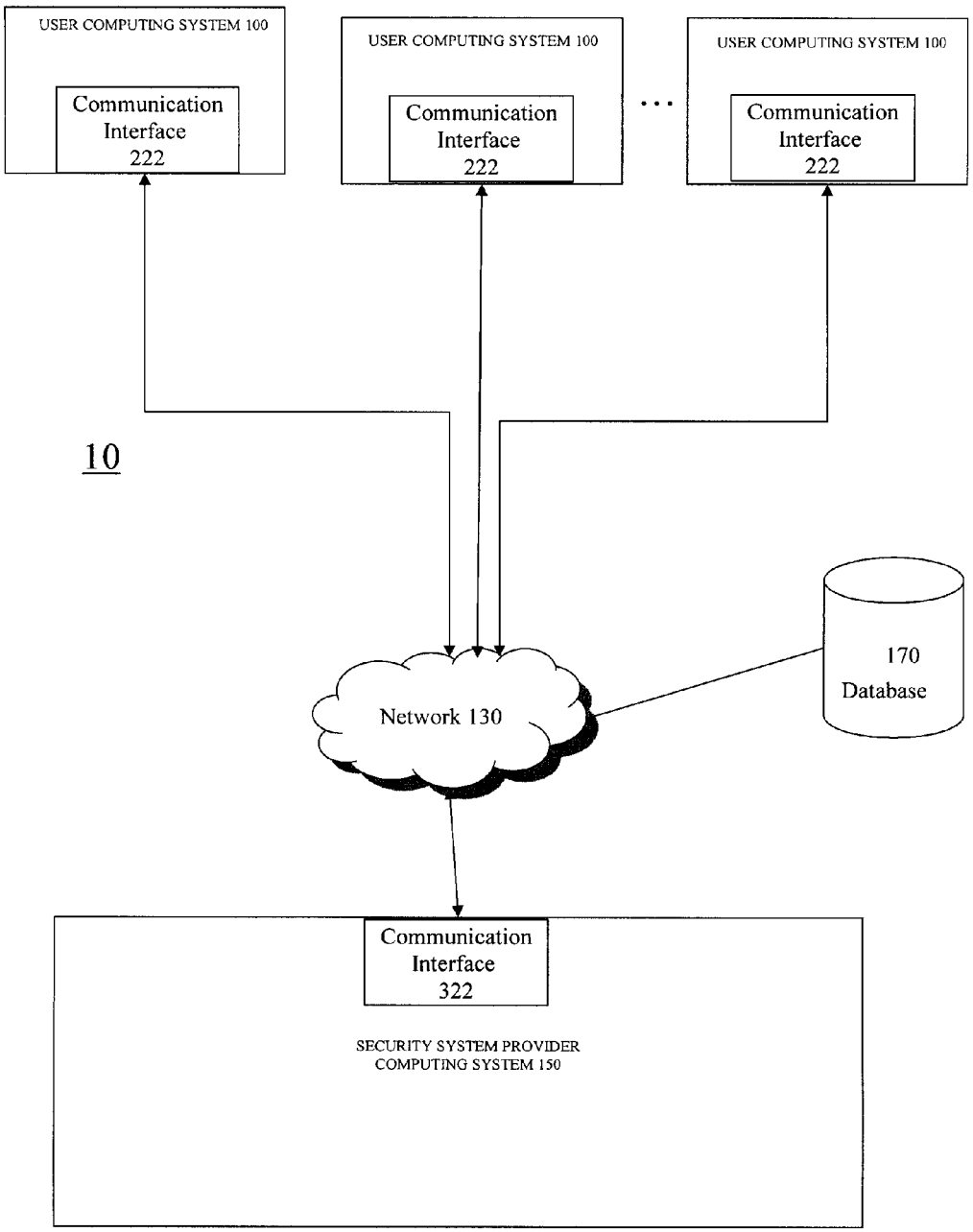
FIG. 1 is a block diagram of an exemplary hardware architecture for implementing one embodiment including user computing systems, a communication network, a database, and a security system provider computing system, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment of a method and apparatus for minimizing the effects of rogue security software, the fact that virtually all rogue security software generates malware alerts to scare the user/victim into submitting their payment information, and the fact that the malware alerts generated by rogue security software are almost never changed, is used to proactively identify potential rogue security software. In one embodiment, a given user computing system is monitored/scanned for any alerts being presented to the user. In one embodiment, once an alert is detected, the alert content is sampled and analyzed for defined keywords that indicate the alert is a malware alert. In one embodiment, any alert sample including the defined keywords is considered a malware alert and is treated as being potentially generated by rogue security software. In one embodiment, all such malware alerts are subjected to an initial malware alert analysis before the user is allowed to see, and/or respond, at least without a warning, to the malware alert including, but not limited to: scanning the malware alert to determine what files are identified in the malware alert as purportedly containing malware and scanning/analyzing the named files to determine if they do indeed contain malware, or if the files even exist; scanning and/or comparing the malware alert with one or more security systems and known rogue security software signatures associated with one or more security system providers; and/or subjecting the malware alert to any other analysis desired. In one embodiment, if, as a result of the initial malware alert analysis, it is determined that the files identified in the malware alert either do not exist, or are uninfected, or that the malware alert is suspicious for any other reason, then the malware alert is determined to be potentially generated by rogue security software and the user is prevented from seeing, and/or responding to, at least without a warning, the malware alert until a more definitive analysis can be performed.

FIG. 1 shows a block diagram of an exemplary hardware system 10 suitable for implementing one embodiment of a process for minimizing the effects of rogue security software, such as exemplary process 400 of FIG. 4 discussed below. Returning to FIG. 1, exemplary hardware system 10 includes: one or more user computing system(s) 100, including communication interface(s) 222; security system provider computing system 150, including communication interface 322; and database 170; all communicating via communication interfaces 222 and 322 and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as security system provider computing system 150 (discussed below) or any one or more of other user computing system(s) 100.

As used herein, the term "computing system", such as is included in the terms "user computing system" and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein and/or as known in the art at the time of filing and/or as developed thereafter, that includes components that can execute all, or part, of a process for minimizing the effects of rogue security software in accordance with at least one of the embodiments as described herein. A more detailed discussion of user computing system(s) 100 is provided below with respect to FIG. 2.

Returning to FIG. 1, in one embodiment, security system provider computing system 150 is any computing system as defined herein and/or as known in the art at the time of filing and/or as developed thereafter, that includes components that can execute all, or part, of a process for minimizing the effects of rogue security software in accordance with at least one of the embodiments as described herein and is accessible by, controlled by, and/or otherwise associated with, a security system provider. As used herein, a security system provider includes, but is not limited to, any party, person, application, system, or entity that desires to identify and block rogue security software.

In one embodiment, security system provider computing system 150 is representative of two or more security system provider computing systems. In one embodiment, security system provider computing system 150 is a client computing system associated with one or more server computing systems. In one embodiment, security system provider computing system 150 is a server computing system that is, in turn, associated with one or more client computing systems that are users of one more security systems provided through, or monitored by, the security system provider associated with security system provider computing system 150. In one embodiment, security system provider computing system 150 is part of a cloud computing environment. A more detailed discussion of security system provider computing system 150 is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100 and/or security system provider computing system 150, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for minimizing the effects of rogue security software, and/or a provider of a security system and/or a security system provider computing system 150. In one embodiment, database 170 is part of a cloud computing environment.

In one embodiment, computing system(s) 100, security system provider computing system 150, and database 170 are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, security system provider computing system 150, and database 170 are coupled in a cloud computing environment.

Figure 2:
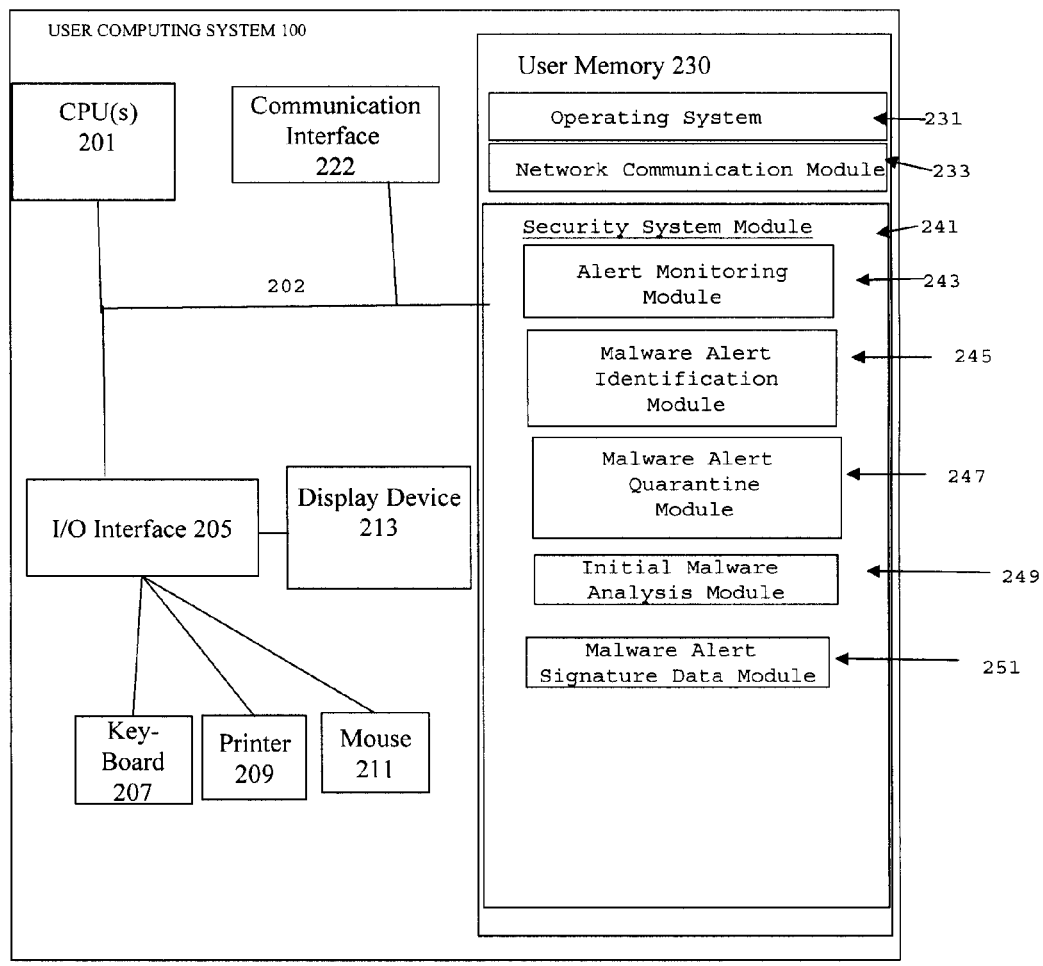
FIG. 2 is a block diagram of an exemplary user computing system of FIG. 1, in accordance with one embodiment.

FIG. 2 is a more detailed block diagram of an exemplary user computing system(s) 100. As seen in FIG. 2, in one embodiment, user computing system(s) 100 include(s) one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202.

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3): operating system 231 that includes procedures, data, and/or instructions for handling various services and performing/coordinating hardware dependent tasks; network communications module 233 that includes procedures, data, and/or instructions, for, along with communication interface 222, connecting user computing system(s) 100 to other computing systems, such as other user computing system(s) 100 and/or security system provider computing system 150 of FIG. 1, and/or a network, such as network 130 of FIG. 1, and/or a database, such as database 170 of FIG. 1; and security system module 241 (FIG. 2) that includes procedures, data, and/or instructions, for intercepting and/or analyzing alerts generated on user computing system(s) 100 to identify and block malware alerts generated by rogue security software.

As also seen in FIG. 2, in one embodiment, security system module 241 of user memory 230 includes: alert monitoring module 243 that includes procedures, data, and/or instructions for monitoring/scanning user computing system(s) 100 to identify alerts generated on user computing system(s) 100; malware alert identification module 245 that includes procedures, data, and/or instructions, for scanning an identified alert for defined keywords that indicate the alert is a malware alert; malware alert quarantine module 247 (FIG. 2) that includes procedures, data, and/or instructions, for preventing a user from seeing, and/or responding to, at least without a warning, a malware alert identified at malware alert identification module 245; initial malware analysis module 249 that includes procedures, data, and/or instructions, for performing an initial malware alert analysis of any malware alert identified at malware alert identification module 245 before the user is allowed to see, and/or respond, at least without a warning, to the malware alert; malware alert signature data module 251 that includes procedures, data, and/or instructions, for generating and storing signature data for any malware alert determined to be associated with rogue security software to identify future instances of the malware alert as being rogue security software malware alerts.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system(s) 100, user memory 230, and security system module 241 of user memory 230, is provided below with respect to FIG. 4.

Figure 3:
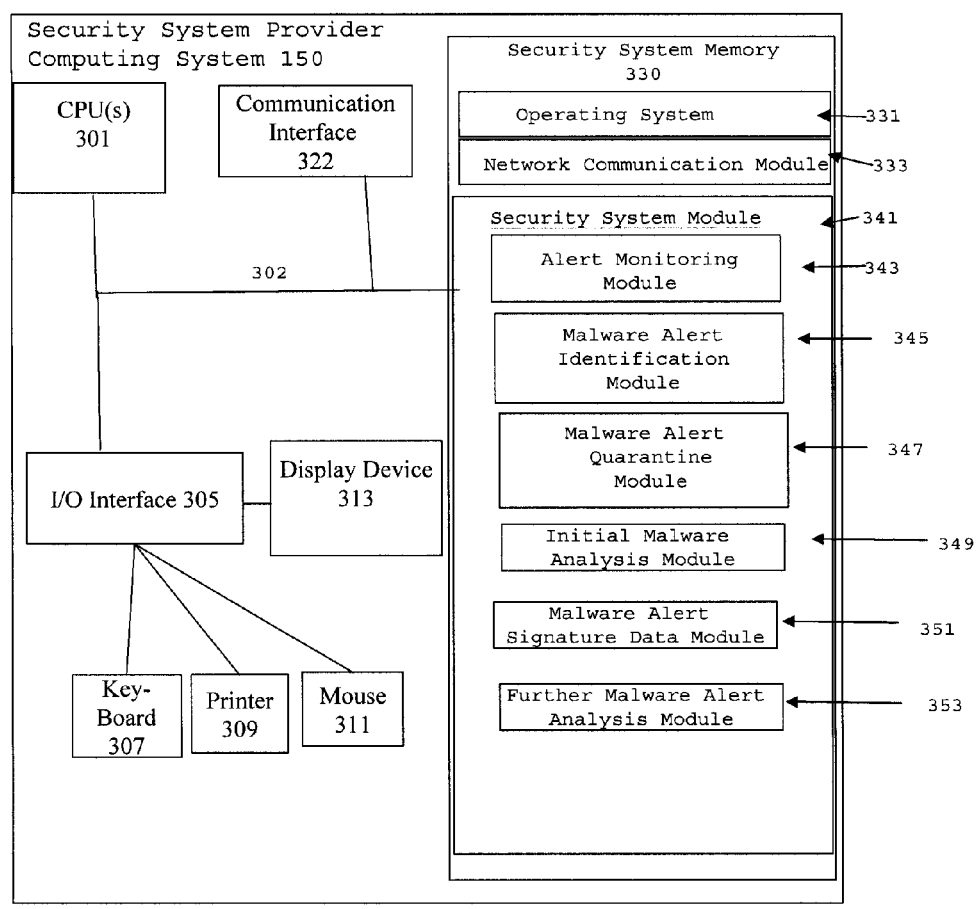
FIG. 3 is a block diagram of an exemplary security system provider computing system of FIG. 1, in accordance with one embodiment.

FIG. 3 is a more detailed block diagram of an exemplary security system provider computing system 150. As seen in FIG. 3, in one embodiment, security system provider computing system 150 includes one or more Central Processing Unit(s), CPU(s) 301; security system memory system 330; at least one communication interface 322; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, security system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3): operating system 331 that includes procedures, data, and/or instructions for handling various services and performing/coordinating hardware dependent tasks; network communications module 333 that includes procedures, data, and/or instructions, for, along with communication interface 322, connecting security system provider computing system 150 to other computing systems, such as user computing system(s) 100 and/or another security system provider computing system, and/or a network, such as network 130 of FIG. 1, and/or a database, such as database 170 of FIG. 1; and security system module 341 (FIG. 3) that includes procedures, data, and/or instructions, for intercepting and/or analyzing alerts generated on user computing system(s) 100 to identify and block malware alerts generated by rogue security software.

As also seen in FIG. 3, in one embodiment, security system module 341 of security system memory 330 includes: alert monitoring module 343 that includes procedures, data, and/or instructions for monitoring/scanning user computing system (s) 100 to identify alerts generated on user computing system (s) 100; malware alert identification module 345 that includes procedures, data, and/or instructions, for scanning an identified alert for defined keywords that indicate the alert is a malware alert; malware alert quarantine module 347 (FIG. 3) that includes procedures, data, and/or instructions, for preventing a user from seeing, and/or responding to, at least without a warning, a malware alert identified at malware alert identification module 345; initial malware analysis module 349 that includes procedures, data, and/or instructions, for performing an initial malware alert analysis of any malware alert identified at malware alert identification module 345 before the user is allowed to see, and/or respond, at least without a warning, to the malware alert; malware alert signature data module 351 that includes procedures, data, and/or instructions, for generating and storing signature data for any malware alert determined to be associated with rogue security software to identify future instances of the malware alert as being rogue security software malware alerts; and further malware alert analysis module includes procedures, data, and/or instructions, for performing analysis of any malware alert identified at malware alert identification module 345 determined to be suspicious at initial malware analysis module 349 and/or initial malware analysis module 249 (FIG. 2).

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary security system provider computing system 150, security system memory system 330, security system module 334 of security system memory system 330, and user data module 343 of security system memory system 330 is provided below with respect to FIG. 4.

Figure 4:
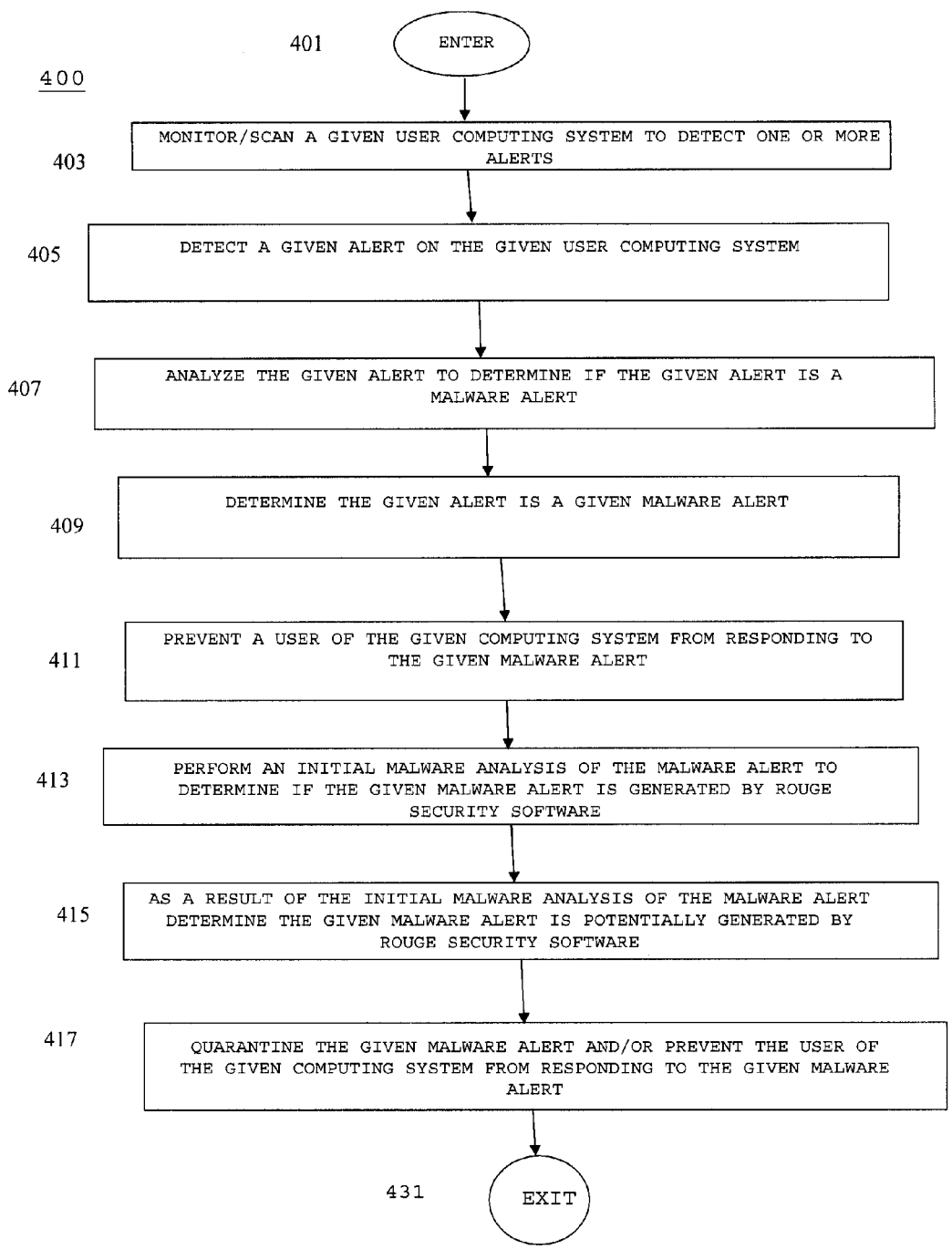
FIG. 4 is a flow chart depicting a process for minimizing the effects of rogue security software in accordance with one embodiment.

FIG. 4 is a flow chart depicting a process for minimizing the effects of rogue security software 400 in accordance with one embodiment.

Process for minimizing the effects of rogue security software 400 begins at ENTER OPERATION 401 and process flow proceeds to MONITOR/SCAN A GIVEN USER COMPUTING SYSTEM TO DETECT ONE OR MORE ALERTS OPERATION 403.

In one embodiment, at MONITOR/SCAN A GIVEN USER COMPUTING SYSTEM TO DETECT ONE OR MORE ALERTS OPERATION 403 a given user computing system is monitored/scanned for any alerts being presented to the user of the given user computing system.

As noted above, herein, the term "alert" includes any graphical and/or textual display shown to a user in an effort to attract a user's attention to the status of any element and/or sub-element of a user computing system. For instance, herein, the term alert includes, but is not limited to: any bubble display shown to a user in an effort to attract a user's attention to the status of any element and/or sub-element of a user computing system; any text box shown to a user in an effort to attract a user's attention to the status of any element and/or sub-element of a user computing system; any pop-up display shown to a user in an effort to attract a user's attention to the status of any element and/or sub-element of a user computing system; any static graphic shown to a user in an effort to attract a user's attention to the status of any element and/or sub-element of a user computing system; any animated graphic shown to a user in an effort to attract a user's attention to the status of any element and/or sub-element of a user computing system; any audio element provided to a user in an effort to attract a user's attention to the status of any element and/or sub-element of a user computing system; or any other mechanism provided to a user in an effort to attract a user's attention to the status of any element and/or sub-element of a user computing system as discussed herein, and/or as known in the art at the time of filing, and/or as developed after the time of filing.

In one embodiment, at MONITOR/SCAN A GIVEN USER COMPUTING SYSTEM TO DETECT ONE OR MORE ALERTS OPERATION 403 at least part of process for minimizing the effects of rogue security software 400 is implemented by one or more processors, such as CPUs 201 of FIG. 2, associated a user computing system, such as user computing system 100 of FIGS. 1 and 2, and the given user computing system is monitored/scanned for any alerts being presented to the user at the user computing system using an alert monitoring module, such as alert monitoring module 243, of security system module 241, of user memory 230, of user computing system 100 of FIG. 2.

Returning to FIG. 3, in one embodiment, at MONITOR/SCAN A GIVEN USER COMPUTING SYSTEM TO DETECT ONE OR MORE ALERTS OPERATION 403 at least part of the process for minimizing the effects of rogue security software 400 is implemented by one or more processors, such as CPUs 301 of FIG. 3 associated with a security system provider computing system and the given user computing system is monitored/scanned for any alerts being presented to the user at the security system provider computing system and the given user computing system is monitored/scanned for any alerts being presented to the user at the user computing system using an alert monitoring module, such as alert monitoring module 343, of security system module 341, of user memory 330, of security system provider computing system 150 of FIG. 3.

In one embodiment, at MONITOR/SCAN A GIVEN USER COMPUTING SYSTEM TO DETECT ONE OR MORE ALERTS OPERATION 403 the given user computing system is monitored/scanned for any type of alert, including malware alerts and/or any other system and/or application alerts using any one or numerous methods for locally and/or remotely monitoring a computing system for alerts as discussed herein, and/or as known in the art at the time of filing, and/or as developed after the time filing.

In one embodiment, once a given user computing system is monitored/scanned for any alerts being presented to the user of the given user computing system at MONITOR/SCAN A GIVEN USER COMPUTING SYSTEM TO DETECT ONE OR MORE ALERTS OPERATION 403, process flow proceeds to DETECT A GIVEN ALERT ON THE GIVEN USER COMPUTING SYSTEM OPERATION 405.

In one embodiment, at DETECT A GIVEN ALERT ON THE GIVEN USER COMPUTING SYSTEM OPERATION 405 an alert is detected on the given user computing system. In one embodiment, once an alert is detected on the given user computing system at DETECT A GIVEN ALERT ON THE GIVEN USER COMPUTING SYSTEM OPERATION 405, process flow proceeds to ANALYZE THE GIVEN ALERT TO DETERMINE IF THE GIVEN ALERT IS A MALWARE ALERT OPERATION 407.

In one embodiment, at ANALYZE THE GIVEN ALERT TO DETERMINE IF THE GIVEN ALERT IS A MALWARE ALERT OPERATION 407 the alert detected at DETECT A GIVEN ALERT ON THE GIVEN USER COMPUTING SYSTEM OPERATION 405 is analyzed/scanned for defined keywords that indicate the alert is a malware alert.

In one embodiment, at ANALYZE THE GIVEN ALERT TO DETERMINE IF THE GIVEN ALERT IS A MALWARE ALERT OPERATION 407 the alert detected at DETECT A GIVEN ALERT ON THE GIVEN USER COMPUTING SYSTEM OPERATION 405 is analyzed/scanned by one or more processors, such as CPUs 201 and/or CPUs 301 of FIGS. 2 and 3, for defined keywords that indicate the alert detected at DETECT A GIVEN ALERT ON THE GIVEN USER COMPUTING SYSTEM OPERATION 405 is a malware alert.

In various embodiments, the defined keywords include, but are not limited to: virus; damage; malware; privacy; infected; warning; antivirus; performance; scan; infection; and/or any other keywords defined by the provider of process for minimizing the effects of rogue security software 400 and/or one or more users of process for minimizing the effects of rogue security software 400.

In one embodiment, the alert detected at DETECT A GIVEN ALERT ON THE GIVEN USER COMPUTING SYSTEM OPERATION 405 is analyzed/scanned for defined keywords that indicate the alert is a malware alert at ANALYZE THE GIVEN ALERT TO DETERMINE IF THE GIVEN ALERT IS A MALWARE ALERT OPERATION 407 using a malware alert identification module, such as malware alert identification modules 247 and/or 347 of FIGS. 2 and 3.

In one embodiment, once the alert detected at DETECT A GIVEN ALERT ON THE GIVEN USER COMPUTING SYSTEM OPERATION 405 is analyzed/scanned for defined keywords that indicate the alert is a malware alert at ANA- LYZE THE GIVEN ALERT TO DETERMINE IF THE GIVEN ALERT IS A MALWARE ALERT OPERATION 407, process flow proceeds to DETERMINE THE GIVEN ALERT IS A GIVEN MALWARE ALERT OPERATION 409.

In one embodiment, at DETERMINE THE GIVEN ALERT IS A GIVEN MALWARE ALERT OPERATION 409 any alert detected at DETECT A GIVEN ALERT ON THE GIVEN USER COMPUTING SYSTEM OPERATION 405 that includes one or more of the defined keywords of ANALYZE THE GIVEN ALERT TO DETERMINE IF THE GIVEN ALERT IS A MALWARE ALERT OPERATION 407 is considered a malware alert, as opposed to any other type of system alert, and data indicating a status of the alert is transformed to indicate the status of malware alert.

In one embodiment, once any alert detected at DETECT A GIVEN ALERT ON THE GIVEN USER COMPUTING SYSTEM OPERATION 405 that includes one or more of the defined keywords of ANALYZE THE GIVEN ALERT TO DETERMINE IF THE GIVEN ALERT IS A MALWARE ALERT OPERATION 407 is considered a malware alert, as opposed to any other type of system alert, and data indicating a status of the alert is transformed to indicate the status of malware alert, at DETERMINE THE GIVEN ALERT IS A GIVEN MALWARE ALERT OPERATION 409, process flow proceeds to PREVENT A USER OF THE GIVEN COMPUTING SYSTEM FROM RESPONDING TO THE GIVEN MALWARE ALERT OPERATION 411.

In one embodiment, at PREVENT A USER OF THE GIVEN COMPUTING SYSTEM FROM RESPONDING TO THE GIVEN MALWARE ALERT OPERATION 411 any alert detected at DETECT A GIVEN ALERT ON THE GIVEN USER COMPUTING SYSTEM OPERATION 405 that includes one or more of the defined keywords of ANALYZE THE GIVEN ALERT TO DETERMINE IF THE GIVEN ALERT IS A MALWARE ALERT OPERATION 407 is considered a malware alert and is treated as being potentially generated by rogue security software. In one embodiment, at PREVENT A USER OF THE GIVEN COMPUTING SYSTEM FROM RESPONDING TO THE GIVEN MALWARE ALERT OPERATION 411 all such malware alerts are prevented form being presented to the user, and/or are not allowed to be responded to by the user, at least without a warning being generated by process for minimizing the effects of rogue security software 400.

In one embodiment, at PREVENT A USER OF THE GIVEN COMPUTING SYSTEM FROM RESPONDING TO THE GIVEN MALWARE ALERT OPERATION 411 any alert detected at DETECT A GIVEN ALERT ON THE GIVEN USER COMPUTING SYSTEM OPERATION 405 that includes one or more of the defined keywords of ANALYZE THE GIVEN ALERT TO DETERMINE IF THE GIVEN ALERT IS A MALWARE ALERT OPERATION 407 is considered a malware alert and is treated as being potentially generated by rogue security software to protect the user while analysis of the malware alert is being performed.

In one embodiment, at PREVENT A USER OF THE GIVEN COMPUTING SYSTEM FROM RESPONDING TO THE GIVEN MALWARE ALERT OPERATION 411 malware alerts are prevented from being presented to the user by quarantining all malware alerts in a malware alert quarantine module, such as malware alert quarantine modules 247 and/or 347 of FIGS. 2 and 3.

In one embodiment, at PREVENT A USER OF THE GIVEN COMPUTING SYSTEM FROM RESPONDING TO THE GIVEN MALWARE ALERT OPERATION 411 a user of the user computing system is prevented from responding to the malware alerts by locking out any user response actions.

In one embodiment, at PREVENT A USER OF THE GIVEN COMPUTING SYSTEM FROM RESPONDING TO THE GIVEN MALWARE ALERT OPERATION 411 a user of the user computing system is presented the malware alerts and/or is allowed to respond to the malware alerts, but only after a notification or alert is generated by process for minimizing the effects of rogue security software 400 and presented to the user warning the user that the malware alert may be associated with rogue security software and may be malicious.

In one embodiment, once any alert detected at DETECT A GIVEN ALERT ON THE GIVEN USER COMPUTING SYSTEM OPERATION 405 that includes one or more of the defined keywords of ANALYZE THE GIVEN ALERT TO DETERMINE IF THE GIVEN ALERT IS A MALWARE ALERT OPERATION 407 is considered a malware alert, is treated as being potentially generated by rogue security software, and is prevented from being presented to the user, and/or being responded to by the user, at least without a warning, at PREVENT A USER OF THE GIVEN COMPUTING SYSTEM FROM RESPONDING TO THE GIVEN MALWARE ALERT OPERATION 411, process flow proceeds to PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413.

In one embodiment, at PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413 all identified malware alerts of DETERMINE THE GIVEN ALERT IS A GIVEN MALWARE ALERT OPERATION 409 are subjected to an initial malware alert analysis before the user is allowed to see, and/or respond to, at least without a warning, the malware alert.

In one embodiment, at PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413 all identified malware alerts of DETERMINE THE GIVEN ALERT IS A GIVEN MALWARE ALERT OPERATION 409 are subjected to initial malware alert analysis before the user is allowed to see, and/or respond to, at least without a warning, the malware alert that includes, but is not limited to, scanning the malware alert to determine what files are identified in the malware alert as purportedly containing malware and then scanning the user computing system to determine if the files identified in the malware alert as purportedly containing malware even exist. This particular initial malware alert analysis is a very useful check given that many files named in the malware alerts associated with rogue security software are completely fictitious and therefore will not be present on the user computing system.

In one embodiment, at PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413 all identified malware alerts of DETERMINE THE GIVEN ALERT IS A GIVEN MALWARE ALERT OPERATION 409 are subjected to initial malware alert analysis before the user is allowed to see, and/or respond to, at least without a warning, the malware alert that includes, but is not limited to, scanning the malware alert to determine what files are identified in the malware alert as purportedly containing malware and identifying a source of the files identified in the malware alert as purportedly containing malware to determine if the source of the files identified in the malware alert as purportedly containing malware is the malware alert itself. This check is particularly useful for detecting instances where rogue security system software introduces the malware alert and the malware alert drops files into the user computing system which are then "identified" by the malware alert as purportedly containing malware, i.e., instances where the malware alert is the source of the files identified in the malware alert as purportedly containing malware is the malware alert itself.

In one embodiment, at PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413 all identified malware alerts of DETERMINE THE GIVEN ALERT IS A GIVEN MALWARE ALERT OPERATION 409 are subjected to initial malware alert analysis before the user is allowed to see, and/or respond to, at least without a warning, the malware alert that includes, but is not limited to, scanning the malware alert to determine what files are identified in the malware alert as purportedly containing malware and identifying a source of the files identified in the malware alert as purportedly containing malware to determine if the source of the files identified in the malware alert as purportedly containing malware is the same source as the malware alert. This check is particularly useful for detecting instances when the files identified in the malware alert as purportedly containing malware are files that were placed on the user commuting system by the same rogue security system that also provided the malware alert itself, i.e., instances where both malware and the malware alert have the same source.

In one embodiment, at PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413 all identified malware alerts of DETERMINE THE GIVEN ALERT IS A GIVEN MALWARE ALERT OPERATION 409 are subjected to initial malware alert analysis before the user is allowed to see, and/or respond to, at least without a warning, the malware alert that includes, but is not limited to, scanning the malware alert to determine what files are identified in the malware alert as purportedly containing malware and comparing the files identified in the malware alert as purportedly containing malware with known "clean" copies of the files to determine if they do indeed contain malware. This initial malware alert analysis is particularly useful when the files identified in the malware alert as purportedly containing malware are system files and/or application files for which known clean copies can be easily obtained/accessed and compared with the files identified in the malware alert as purportedly containing malware.

In one embodiment, at PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413 all identified malware alerts of DETERMINE THE GIVEN ALERT IS A GIVEN MALWARE ALERT OPERATION 409 are subjected to initial malware alert analysis before the user is allowed to see, and/or respond to, at least without a warning, the malware alert that includes, but is not limited to, scanning/analyzing the files identified in the malware alert as purportedly containing malware using one or more security systems associated with one or more security system providers to determine if they do indeed contain malware.

In one embodiment, at PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413 all identified malware alerts of DETERMINE THE GIVEN ALERT IS A GIVEN MALWARE ALERT OPERATION 409 are subjected to initial malware alert analysis before the user is allowed to see, and/or respond to, at least without a warning, the malware alert that includes, but is not limited to, any combination of the initial malware alert analyses discussed herein and/or any other initial malware alert analysis desired by the provider of process for minimizing the effects of rogue security software 400 and/or one or more users of process for minimizing the effects of rogue security software 400, whether known at the time of filing or as developed after the time of filing.

In one embodiment, at PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413 all identified malware alerts of DETERMINE THE GIVEN ALERT IS A GIVEN MALWARE ALERT OPERATION 409 are subjected to an initial malware alert analysis before the user is allowed to see, and/or respond to, at least without a warning, the malware alert using an initial malware analysis module, such as initial malware analysis modules 249 and/or 349 of FIGS. 2 and 3.

In one embodiment, once all identified malware alerts of DETERMINE THE GIVEN ALERT IS A GIVEN MALWARE ALERT OPERATION 409 are subjected to an initial malware alert analysis before the user is allowed to see, and/or respond to, at least without a warning, the malware alert at PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413, process flow proceeds to AS A RESULT OF THE INITIAL MALWARE ANALYSIS OF THE MALWARE ALERT DETERMINE THE GIVEN MALWARE ALERT IS POTENTIALLY GENERATED BY ROGUE SECURITY SOFTWARE OPERATION 415.

In one embodiment, at AS A RESULT OF THE INITIAL MALWARE ANALYSIS OF THE MALWARE ALERT DETERMINE THE GIVEN MALWARE ALERT IS POTENTIALLY GENERATED BY ROGUE SECURITY SOFTWARE OPERATION 415 if, as a result of the initial malware alert analysis of PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413, it is determined that the files identified in the malware alert either do not exist, or are uninfected, or that the malware alert is suspicious for any other reason, then the malware alert is determined to be potentially generated by rogue security software, data indicating a status of the malware alert is transformed to indicate the status of malware alert potentially generated by rogue security software, and the user is prevented from seeing, and/or responding to, at least without a warning, the malware alert until a more definitive analysis can be performed.

In one embodiment, at AS A RESULT OF THE INITIAL MALWARE ANALYSIS OF THE MALWARE ALERT DETERMINE THE GIVEN MALWARE ALERT IS POTENTIALLY GENERATED BY ROGUE SECURITY SOFTWARE OPERATION 415 if, as a result of the initial malware alert analysis of PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413, it is determined that the malware alert is suspicious for any reason, then the malware alert is determined to be potentially generated by rogue security software, data indicating a status of the malware alert is transformed to indicate the status of malware alert potentially generated by rogue security software, and the malware alert is prevented from being presented to the user by quarantining the malware alert in a malware alert quarantine module, such as malware alert quarantine modules 247 and/or 347 of FIGS. 2 and 3 until a more definitive analysis can be performed.

Returning to FIG. 4, in one embodiment, at AS A RESULT OF THE INITIAL MALWARE ANALYSIS OF THE MALWARE ALERT DETERMINE THE GIVEN MALWARE ALERT IS POTENTIALLY GENERATED BY ROGUE SECURITY SOFTWARE OPERATION 415 if, as a result of the initial malware alert analysis of PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413, it is determined that the malware alert is suspicious for any reason, then the malware alert is determined to be potentially generated by rogue security software, data indicating a status of the malware alert is transformed to indicate the status of malware alert potentially generated by rogue security software, and a user of the user computing system is prevented from responding to the malware alert by locking out any user response actions.

In one embodiment, at AS A RESULT OF THE INITIAL MALWARE ANALYSIS OF THE MALWARE ALERT DETERMINE THE GIVEN MALWARE ALERT IS POTENTIALLY GENERATED BY ROGUE SECURITY SOFTWARE OPERATION 415 if, as a result of the initial malware alert analysis of PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413, it is determined that the malware alert is suspicious for any reason, then the malware alert is determined to be potentially generated by rogue security software, data indicating a status of the malware alert is transformed to indicate the status of malware alert potentially generated by rogue security software, and a user of the user computing system is presented the malware alerts and/or is allowed to respond to the malware alerts, but only after a notification or alert is generated by process for minimizing the effects of rogue security software 400 and presented to the user warning the user that the malware alert may be associated with rogue security software and may be malicious.

In one embodiment, at AS A RESULT OF THE INITIAL MALWARE ANALYSIS OF THE MALWARE ALERT DETERMINE THE GIVEN MALWARE ALERT IS POTENTIALLY GENERATED BY ROGUE SECURITY SOFTWARE OPERATION 415 if, as a result of the initial malware alert analysis of PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413, it is determined that the malware alert is suspicious for any reason, then the malware alert is subjected to further malware alert analysis.

In one embodiment, at AS A RESULT OF THE INITIAL MALWARE ANALYSIS OF THE MALWARE ALERT DETERMINE THE GIVEN MALWARE ALERT IS POTENTIALLY GENERATED BY ROGUE SECURITY SOFTWARE OPERATION 415 if, as a result of the initial malware alert analysis of PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413, it is determined that the malware alert is suspicious for any reason, then the malware alert is subjected to further malware alert analysis including, but not limited to, scanning with one of more security systems offered by one or more security system providers.

In one embodiment, at AS A RESULT OF THE INITIAL MALWARE ANALYSIS OF THE MALWARE ALERT DETERMINE THE GIVEN MALWARE ALERT IS POTENTIALLY GENERATED BY ROGUE SECURITY SOFTWARE OPERATION 415 if, as a result of the initial malware alert analysis of PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413, it is determined that the malware alert is suspicious for any reason, then the malware alert is subjected to further malware alert analysis including, but not limited to, analysis performed by one or more researchers associated with one or more security system providers.

In one embodiment, at AS A RESULT OF THE INITIAL MALWARE ANALYSIS OF THE MALWARE ALERT DETERMINE THE GIVEN MALWARE ALERT IS POTENTIALLY GENERATED BY ROGUE SECURITY SOFTWARE OPERATION 415 if, as a result of the initial malware alert analysis of PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413, it is determined that the malware alert is suspicious for any reason, then the malware alert is subjected to further malware alert analysis including, but not limited to, any of the analysis, or combination of analysis, described herein, and/or as known in the art at the time of filing, and/or as developed after the time of filing.

In one embodiment, at AS A RESULT OF THE INITIAL MALWARE ANALYSIS OF THE MALWARE ALERT DETERMINE THE GIVEN MALWARE ALERT IS POTENTIALLY GENERATED BY ROGUE SECURITY SOFTWARE OPERATION 415 if, as a result of the initial malware alert analysis of PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413, it is determined that the malware alert is suspicious for any reason, then the malware alert is subjected to further malware alert analysis using a further malware alert analysis module, such as further malware alert analysis module 353 of FIG. 3.

In on embodiment, once a more definitive analysis is performed, if the malware alert is deemed to be generated by rogue security software, data indicating a status of the malware alert is transformed to indicate the status of malware alert generated by rogue security software, signature data for the malware alert is stored in a rogue security software malware alert database and the data in the rogue security software malware alert database is used to identify future instances of the malware alert as being rogue security software malware alerts.

In one embodiment, once, if, as a result of the initial malware alert analysis of PERFORM AN INITIAL MALWARE ANALYSIS OF THE MALWARE ALERT TO DETERMINE IF THE GIVEN MALWARE ALERT IS GENERATED BY ROGUE SECURITY SOFTWARE OPERATION 413, it is determined that the files identified in the malware alert either do not exist, or are uninfected, or that the malware alert is suspicious for any other reason, then the malware alert is determined to be potentially generated by rogue security software and the user is prevented from seeing, and/or responding to, at least without a warning, the malware alert until a more definitive analysis can be performed at AS A RESULT OF THE INITIAL MALWARE ANALYSIS OF THE MALWARE ALERT DETERMINE THE GIVEN MALWARE ALERT IS POTENTIALLY GENERATED BY ROGUE SECURITY SOFTWARE OPERATION 415, process flow proceeds to EXIT OPERATION 431. In one embodiment, at EXIT OPERATION 431 process for minimizing the effects of rogue security software 400 is exited to await new data.

Using one embodiment of process for minimizing the effects of rogue security software 400, the fact that virtually all rogue security software generates malware alerts to scare the user/victim into submitting their payment information is used to focus detection of rogue security software efforts on the malware alerts themselves. In addition, process for minimizing the effects of rogue security software 400 makes use of the fact that, while developers of rogue security software often change the GUI associated with the rogue security software, they rarely, if ever, change the malware alerts generated by rogue security software or the infection mechanism used by the rogue security software. This is because if the malware alert changes, the users/victims are less likely to trust the malicious malware alert.

In addition, using process for minimizing the effects of rogue security software 400, virtually all malware alerts are treated as suspect, and the user is prevented from seeing, and/or responding to, at least without a warning, the malware alert until at least an initial malware alert analysis can be performed. Consequently, unlike currently available reactive rogue security software systems, process for minimizing the effects of rogue security software 400 is proactive and seeks to protect the user before any harm can be done.

As a result, using process for minimizing the effects of rogue security software 400, rogue security software is more reliably and quickly detected before any harm is done and, therefore, fewer users are likely to fall victim to these very serious and damaging scams.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "monitoring", "detecting", "analyzing", "storing", "saving", "classifying", "comparing", "determining", "processing", "using", "preventing", "quarantining" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for minimizing the effects of rogue security software comprising:
providing a security system to monitor a given user computing system to detect any alerts generated regarding the given user computing system, the security system being implemented, at least in part, on one or more computing systems;
detecting a given alert regarding the given user computing system through the security system;
analyzing the given alert regarding the given user computing system using one or more processors associated with the one or more computing systems and determining that the given alert is a malware alert, wherein a malware alert is an alert that is generated to alert a user of the user computing system of one or more malware files the alert indicates are present within the user computing system;
transforming data indicating a status of the given alert regarding the given user computing system to data indicating a status of malware alert using one or more processors associated with the one or more computing systems;
taking one or more actions to protect a user of the given user computing system from responding to the given malware alert while an initial malware alert analysis of the given malware alert is performed;
performing the initial malware alert analysis of the given malware alert using one or more processors associated with the one or more computing systems and determining that the malware alert is associated with rogue security software, wherein determining that the malware alert is associated with rogue security software comprises determining that at least one of the files indicated by the alert is not present within the system;
transforming data indicating a status of the given malware alert to data indicating a status of malware alert potentially associated with rogue security software using one or more processors associated with the one or more computing systems; and
taking one or more actions to protect a user of the given user computing system from responding to the given malware alert at least until further analysis of the given malware alert is performed.

2. The computing system implemented process for minimizing the effects of rogue security software of claim 1, wherein:
analyzing the given alert regarding the given user computing system using one or more processors associated with the one or more computing systems includes scanning the given alert regarding the given user computing system using one or more processors associated with the one or more computing systems to check for one or more defined keywords that indicate the given alert is a malware alert.

3. The computing system implemented process for minimizing the effects of rogue security software of claim 1, wherein:
the initial malware alert analysis of the given malware alert includes scanning the given malware alert to determine one of more user computing system files identified in the given malware alert as purportedly containing malware and identifying the source of the files identified in the given malware alert.

4. The computing system implemented process for minimizing the effects of rogue security software of claim 1, wherein:
at least one of the one or more actions taken to protect a user of the given user computing system from responding to the given malware alert is selected from the group of protective actions consisting of:
quarantining the given malware alert;
disabling one or more potential user response actions to the given malware alert; and
generating a warning and presenting the warning to the user warning the user that the given malware alert may be associated with rogue security software and may be malicious.

5. The computing system implemented process for minimizing the effects of rogue security software of claim 1, wherein:
the initial malware alert analysis of the given malware alert includes scanning the given malware alert to determine what files are identified in the given malware alert as purportedly containing malware and then scanning the given user computing system to determine if the files identified in the given malware alert as purportedly containing malware are present on the given user computing system.

6. The computing system implemented process for minimizing the effects of rogue security software of claim 1, wherein:

the initial malware alert analysis of the given malware alert includes scanning the given malware alert to determine what files are identified in the given malware alert as purportedly containing malware and then comparing the files identified in the given malware alert as purportedly containing malware with known "clean" copies of the files identified in the given malware alert as purportedly containing malware to determine if they do contain malware.

7. The computing system implemented process for minimizing the effects of rogue security software of claim 1, wherein:

the initial malware alert analysis of the given malware alert includes scanning the given malware alert to determine what files are identified in the given malware alert as purportedly containing malware and scanning/analyzing the files identified in the given malware alert as purportedly containing malware using one or more security systems associated with one or more security system providers to determine if the files identified in the given malware alert as purportedly containing malware do in fact contain malware.

8. A system for minimizing the effects of rogue security software comprising:

a given user computing system;

a security system associated with the given user computing system;

a security system provider computing system;

one or more processors associated with the security system provider computing system, the one or more processors associated with the security system provider computing system executing at least part of a computing system implemented process for minimizing the effects of rogue security software, the computing system implemented process for minimizing the effects of rogue security software comprising:

monitoring the given user computing system using the security system to detect any alerts generated regarding the given user computing system, the security system being implemented, at least in part, by the security system provider computing system;

detecting a given alert regarding the given user computing system through the security system;

analyzing the given alert regarding the given user computing system using the one or more processors associated with the security system provider computing system and determining that the given alert is a malware alert, wherein a malware alert is an alert that is generated to alert a user of the user computing system of one or more malware files the alert indicates are present within the user computing system;

transforming data indicating a status of the given alert regarding the given user computing system to data indicating a status of malware alert using the one or more processors associated with the security system provider computing system;

taking one or more actions to protect a user of the given user computing system from responding to the given malware alert while an initial malware alert analysis of the given malware alert is performed;

performing the initial malware alert analysis of the given malware alert using the one or more processors associated with the security system provider computing system and determining that the malware alert is associated with rogue security software, wherein determining that the malware alert is associated with rogue security software comprises determining that at least one of the files indicated by the alert is not present within the system;

transforming data indicating a status of the given malware alert to data indicating a status of malware alert potentially associated with rogue security software using the one or more processors associated with the security system provider computing system; and taking one or more actions to protect a user of the given user computing system from responding to the given malware alert at least until further analysis of the given malware alert is performed.

9. The system for minimizing the effects of rogue security software of claim 8, wherein:

analyzing the given alert regarding the given user computing system using the one or more processors associated with the security system provider computing system includes scanning the given alert regarding the given user computing system using the one or more processors associated with the security system provider computing system to check for one or more defined keywords that indicate the given alert is a malware alert.

10. The computing system implemented process for minimizing the effects of rogue security software of claim 9, wherein:

the initial malware alert analysis of the given malware alert includes scanning the given malware alert to determine one of more user computing system files identified in the given malware alert as purportedly containing malware and identifying the source of the files identified in the given malware alert.

11. The system for minimizing the effects of rogue security software of claim 8, wherein:

at least one of the one or more actions taken to protect a user of the given user computing system from responding to the given malware alert is selected from the group of protective actions consisting of:

quarantining the given malware alert;

disabling one or more potential user response actions to the given malware alert; and generating a warning and presenting the warning to the user warning the user that the given malware alert may be associated with rogue security software and may be malicious.

12. The system for minimizing the effects of rogue security software of claim 8, wherein:

the initial malware alert analysis of the given malware alert includes scanning the given malware alert to determine one of more user computing system files identified in the given malware alert as purportedly containing malware and then scanning the given user computing system to determine if the files identified in the given malware alert as purportedly containing malware are present on the given user computing system.

13. The system for minimizing the effects of rogue security software of claim 8, wherein:

the initial malware alert analysis of the given malware alert includes scanning the given malware alert to determine what files are identified in the given malware alert as purportedly containing malware and then comparing the files identified in the given malware alert as purportedly containing malware with known "clean" copies of the files identified in the given malware alert as purportedly containing malware to determine if they do contain malware.

14. The system for minimizing the effects of rogue security software of claim 8, wherein:
the initial malware alert analysis of the given malware alert includes scanning the given malware alert to determine what files are identified in the given malware alert as purportedly containing malware and scanning/analyzing the files identified in the given malware alert as purportedly containing malware using one or more security systems associated with one or more security system providers to determine if the files identified in the given malware alert as purportedly containing malware do in fact contain malware.

15. A system for minimizing the effects of rogue security software comprising:
a given user computing system;
a security system associated with the given user computing system;
one or more processors associated with the given user computing system, the one or more processors associated with the given user computing system executing at least part of a computing system implemented process for minimizing the effects of rogue security software, the computing system implemented process for minimizing the effects of rogue security software comprising:
monitoring the given user computing system using the security system to detect any alerts generated regarding the given user computing system, the security system being implemented, at least in part, by the given user computing system;
detecting a given alert regarding the given user computing system through the security system;
analyzing the given alert regarding the given user computing system using the one or more processors associated with the given user computing system and determining that the given alert is a malware alert, wherein a malware alert is an alert that is generated to alert a user of the user computing system of one or more malware files the alert indicates are present within the user computing system;
transforming data indicating a status of the given alert regarding the given user computing system to data indicating a status of malware alert using the one or more processors associated with the given user computing system;
taking one or more actions to protect a user of the given user computing system from responding to the given malware alert while an initial malware alert analysis of the given malware alert is performed;
performing the initial malware alert analysis of the given malware alert using the one or more processors associated with the given user computing system and determining that the malware alert is associated with rogue security software, wherein determining that the malware alert is associated with rogue security software comprises determining that at least one of the files indicated by the alert is not present within the system;
transforming data indicating a status of the given malware alert to data indicating a status of malware alert potentially associated with rogue security software using the one or more processors associated with the given user computing system; and
taking one or more actions to protect a user of the given user computing system from responding to the given malware alert at least until further analysis of the given malware alert is performed.

16. The system for minimizing the effects of rogue security software of claim 15, wherein:
analyzing the given alert regarding the given user computing system using the one or more processors associated with the given user computing system to determine if the given alert is a malware alert includes scanning the given alert regarding the given user computing system using the one or more processors associated with the given user computing system to check for one or more defined keywords that indicate the given alert is a malware alert.

17. The computing system implemented process for minimizing the effects of rogue security software of claim 16, wherein:
the initial malware alert analysis of the given malware alert includes scanning the given malware alert to determine one of more user computing system files identified in the given malware alert as purportedly containing malware and identifying the source of the files identified in the given malware alert.

18. The system for minimizing the effects of rogue security software of claim 15, wherein:
at least one of the one or more actions taken to protect a user of the given user computing system from responding to the given malware alert is selected from the group of protective actions consisting of:
quarantining the given malware alert;
disabling one or more potential user response actions to the given malware alert; and
generating a warning and presenting the warning to the user warning the user that the given malware alert may be associated with rogue security software and may be malicious.

19. The system for minimizing the effects of rogue security software of claim 15, wherein:
the initial malware alert analysis of the given malware alert includes scanning the given malware alert to determine what files are identified in the given malware alert as purportedly containing malware and then scanning the given user computing system to determine if the files identified in the given malware alert as purportedly containing malware are present on the given user computing system.

20. The system for minimizing the effects of rogue security software of claim 15, wherein:
the initial malware alert analysis of the given malware alert includes scanning the given malware alert to determine what files are identified in the given malware alert as purportedly containing malware and then comparing the files identified in the given malware alert as purportedly containing malware with known "clean" copies of the files identified in the given malware alert as purportedly containing malware to determine if they do contain malware.

* * * * *

UNITED STATES PATENT AND TRADEMARK OFFICE
CERTIFICATE OF CORRECTION

PATENT NO. : 8,479,289 B1
APPLICATION NO. : 12/606418
DATED : July 2, 2013
INVENTOR(S) : Bhaskar Krishnappa Page 1 of 1

It is certified that error appears in the above-identified patent and that said Letters Patent is hereby corrected as shown below:

In the Claims

In Column 22, Line 41, Claim 3, replace "one of more" with --one or more--;
In Column 24, Line 33, Claim 10, replace "one of more" with --one or more--;
In Column 24, Line 54, Claim 12, replace "one of more" with --one or more--; and
In Column 26, Line 23, Claim 17, replace "one of more" with --one or more--.

Signed and Sealed this
Twenty-second Day of October, 2013

Teresa Stanek Rea
*Deputy Director of the United States Patent and Trademark Office*